(12) United States Patent
Campbell et al.

(10) Patent No.: US 9,747,468 B1
(45) Date of Patent: Aug. 29, 2017

(54) SYSTEM AND METHOD FOR COMMUNICATION AMONG MOBILE APPLICATIONS

(71) Applicant: JPMorgan Chase Bank, N.A., New York, NY (US)

(72) Inventors: Amanda J. Campbell, Newark, DE (US); Constantin Gonciulea, Upper Arlington, OH (US); Steven J. Wallace, Columbus, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 14/802,062

(22) Filed: Jul. 17, 2015

Related U.S. Application Data (62) Division of application No. 13/930,494, filed on Jun. 28, 2013, now Pat. No. 9,152,477.

(60) Provisional application No. 61/831,358, filed on Jun. 5, 2013.

(51) Int. Cl.
*G06F 13/00* (2006.01)
*G06F 21/62* (2013.01)
*H04W 12/08* (2009.01)

(52) U.S. Cl.
CPC .......... *G06F 21/629* (2013.01); *H04W 12/08* (2013.01)

(58) Field of Classification Search
CPC .... G06F 9/546; H04L 29/06; H04L 29/08072
USPC .......... 709/217, 218; 719/310, 313
See application file for complete search history.

(56) References Cited

U.S. PATENT DOCUMENTS

| | | | |
|---|---|---|---|
| 8,591,342 B2 * | 11/2013 | Takahashi | A63F 13/12 463/31 |
| 9,277,394 B2 * | 3/2016 | Tobin | H04W 8/20 |
| 2004/0036611 A1 | 2/2004 | Kidney et al. | |
| 2013/0024873 A1 * | 1/2013 | Hillier | G06F 9/54 719/313 |
| 2014/0057589 A1 | 2/2014 | Velusamy et al. | |

* cited by examiner

*Primary Examiner* — Andy Ho
(74) *Attorney, Agent, or Firm* — Hunton & Williams LLP (57) ABSTRACT

Systems and methods for communication among mobile applications are disclosed. In one embodiment, a method for a first mobile application and a second mobile application on a mobile device to share information includes (1) a first mobile application executed by a computer processor on a mobile device determining that a second mobile application is present on the mobile device; (2) receiving, from a user, permission for the first mobile application to access data from the second application; (3) the first application executed by the computer processor requesting data from the second application; and (4) the first application receiving the requested data from the second application.

13 Claims, 4 Drawing Sheets

SYSTEM AND METHOD FOR COMMUNICATION AMONG MOBILE APPLICATIONS

RELATED APPLICATIONS

This patent application is a Divisional of U.S. patent application Ser. No. 13/930,494, now U.S. Pat. No. 9,152,477, filed Jun. 28, 2013, which is related to U.S. Provisional Patent Application Ser. No. 61/831,358, filed Jun. 5, 2013, the disclosure of each of which is hereby incorporated by reference in its entirety.

BACKGROUND OF THE INVENTION

1. Field of the Invention

The present invention generally relates to communication among a plurality of mobile applications executed on mobile devices.

2. Description of the Related Art

Mobile electronic devices, including smartphones (e.g., Apple iPhone, Samsung Galaxy, etc.), tablet computers (e.g., Apple iPad, Samsung Galaxy, Amazon Kindle, Barnes & Noble Nook Tablet, etc.), e-Readers, etc. may be loaded with several specific applications, or "Apps," that provide specific functionality to the user. Users often load their devices with applications that provide convenient banking, shopping, and travel functions.

SUMMARY OF THE INVENTION

Systems and methods for communication among mobile applications are disclosed. In one embodiment, a method for a first mobile application and a second mobile application on a mobile device to share information includes (1) a first mobile application executed by a computer processor on a mobile device determining that a second mobile application is present on the mobile device; (2) receiving, from a user, permission for the first mobile application to access data from the second application; (3) the first application executed by the computer processor requesting data from the second application; and (4) the first application receiving the requested data from the second application.

In one embodiment, the first mobile application may determine that a second mobile application is present on the mobile device by accessing a mobile device registry. In one embodiment, the mobile device registry may be on the mobile device.

In another embodiment, the first mobile application may determine that a second mobile application is present on the mobile device by scanning the mobile device for applications.

In one embodiment, the permission may be received by the first mobile application directly from the user. In another embodiment, the permission may be received at a website for a host of the mobile device. In still another embodiment, the permission may be received at a website for a host of the first application. In another embodiment, the permission may be received by the second mobile application directly from the user.

A method for controlling interaction using a mobile electronic device is disclosed. In one embodiment, the method may include (1) receiving, at a mobile electronic device, a request to interact with a third party; (2) retrieving, from a memory of the mobile electronic device, a plurality of personas, each of the persona indicating an action to take in response to the request; (3) at least one computer processor of the mobile electronic device selecting one of the plurality of personas; and (4) the at least one computer processor taking the action in response to the request for the selected persona.

In one embodiment, the request to interact may be a request to conduct a transaction. In another embodiment, the request to interact may be a request to provide information to a social network. In one embodiment, the request to interact may be a request to communicate.

In one embodiment, the persona may be selected based on a location of the mobile electronic device. In another embodiment, the persona may be selected based on a time of day. In still another embodiment, the persona may be selected based on ambient intelligence. In yet another embodiment, the persona may be selected based on an identification of at least one electronic device in the vicinity of the mobile electronic device.

In one embodiment, the persona may be defined by a user of the mobile electronic device. In another embodiment, the persona may be defined based on a plurality of interactions by a user of the mobile electronic device.

In one embodiment, the persona may be updated based on interactions approved by a user of the mobile electronic device.

A method for controlling interaction using a mobile electronic device is disclosed. According to one embodiment, the method may include (1) receiving, at a mobile electronic device, a request to interact with a third party; (2) receiving, at the mobile electronic device and from a user, an action to take in response to the request; (3) using at least one computer processor of the mobile electronic device, determining at least one parameter associated with the request; and (4) associating, in a memory of the mobile electronic device, the request and the at least one parameter with the action.

According to one embodiment, the request to interact may be a request to conduct a transaction. According to another embodiment, the request to interact may be a request to provide information to a social network. In still another embodiment, the request to interact may be a request to communicate.

In one embodiment, the parameter may be a location of the mobile electronic device. In another embodiment, the parameter may be a time of day. In still another embodiment, the parameter may be an identification of at least one electronic device in the vicinity of the mobile electronic device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-34, wherein like reference numerals refer to like elements.

Embodiments of the invention are based on different mobile applications on mobile devices being able to access and use data that is passed between mobile applications.

Mobile applications that are used on mobile devices generally perform specific functions and function independently of other mobile applications that are available on the mobile device. Typically, the mobile application interfaces with a user and with a server over a network. Data that may be accessible through another mobile application may be inaccessible by the running mobile application without the user copying and pasting that data manually.

According to embodiments of the invention, a first mobile application may be able to determine the other applications that are present on the mobile device, and may be able to access the other mobile applications and access data from those applications. For example, if a user is at the checkout screen on a merchant's mobile application, the merchant's mobile application (or a global application that can access all applications) may recognize that there is a banking mobile application on the mobile device. The merchant's mobile application may query the ban king mobile application to see if the user has an account (e.g., a credit card account) that provides access to a rewards site which may allow the user to pay for some or all of the transaction with rewards points, receive a discount, etc. The banking mobile application may then return the requested information to the merchant's mobile application, which may then give the user the option of using points rather than paying with a credit card.

There are various ways in which the information may be provided from the third party (e.g., the bank) mobile application to the first mobile application (e.g., the merchant mobile application). As noted above, the information may be provided directly from the third party mobile application to the first mobile application. In another embodiment, the information may be provided from the third party mobile application to the first mobile application via a host website for the first mobile application (e.g., merchant.com). The information may then be pushed to the first mobile application by the host website.

Similarly, if a user is booking a flight using a mobile travel application (e.g., Expedia, Travelocity, etc.), the mobile travel application may recognize that the user has a mobile application for a particular airline. The mobile travel application may then query the user's points balance to determine if the user is eligible for a free ticket, upgrades, etc. The mobile travel application may also recognize that if the user took a different carrier, the user would have enough points for a free trip after the travel is complete.

In one embodiment, permissions may be granted to certain applications that are specifically identified by the host application to minimize phishing. For example, a mobile banking application may have a specific account identifier that may be used to authenticate itself to other third party mobile applications. Without a valid application identifier, the third party mobile application may not allow access. In another embodiment, the mobile banking application may have a specific account identifier that is valid with only a specific third party mobile application. In yet another embodiment, a "token" may be used for the mobile banking account to use with the other third party mobile application (s).

In still another embodiment, one (or both) of the first mobile application or the third party mobile application may request permission (e.g., user name, password, etc.) from the user.

In one embodiment, certain information that is of a low-security (e.g., number of rewards points, frequent flyer miles, etc.) may be accessed from a third party mobile application, but the third party mobile application may not be able to use the points, miles, etc. The disclosure of U.S. patent application Ser. No. 13/795,306 is hereby incorporated by reference in its entirety.

In one embodiment, a limit on the type of data, amount of data, timeliness of data, level of detail, etc. may be placed on the data that is provided.

In yet another embodiment, authorization may be granted to a third party mobile application by the mobile application website.

In addition, the access that the user grants to a host mobile application may be defined in the host application, in the mobile application site, on the host mobile application's website, etc.

Figure 1:
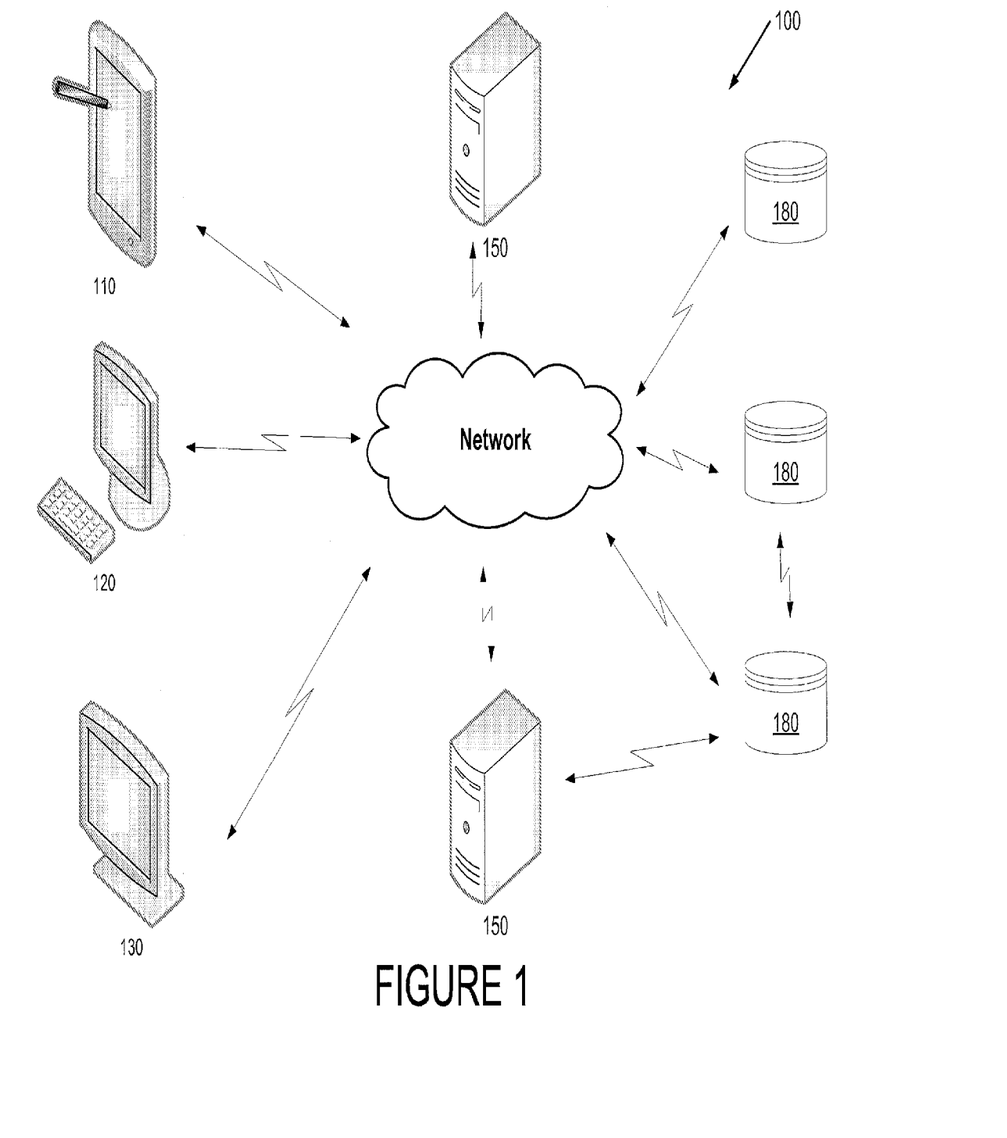
FIG. 1 is a block diagram of a system communication among mobile applications according to one embodiment.

Referring to FIG. 1, a system for communication among mobile applications is disclosed. System 100 may include mobile device 110, computer 120, terminal 130, server 150, and database 180.

In one embodiment, mobile device 110 may be any suitable mobile device, including a smartphone (e.g., Apple iPhone, Samsung Galaxy, etc.), a tablet computer (e.g., Apple iPad, Samsung Galaxy, Amazon Kindle, Barnes & Noble Nook Tablet, etc.), Google Glass, Smart E-watch/Bracelet, etc.

Server 150 may be the host server for a mobile application that may exist on, or be accessed by, mobile device 110, computer 120, or terminal 130. In one embodiment, server 150 may host a website for the provider of the mobile application. In one embodiment, multiple servers 150 may be provided, and may communicate using, for example, a network such as the Internet. Other networks and combinations of networks may be used as necessary and/or desired.

In one embodiment, databases 180 may be provided. In one embodiment, databases 180 may store information related to customer profiles, accounts, etc. In one embodiment, each mobile application may communicate with a database 180, and, in one embodiment, multiple databases may communicate directly or through one or more server 150 via a network.

Figure 2:
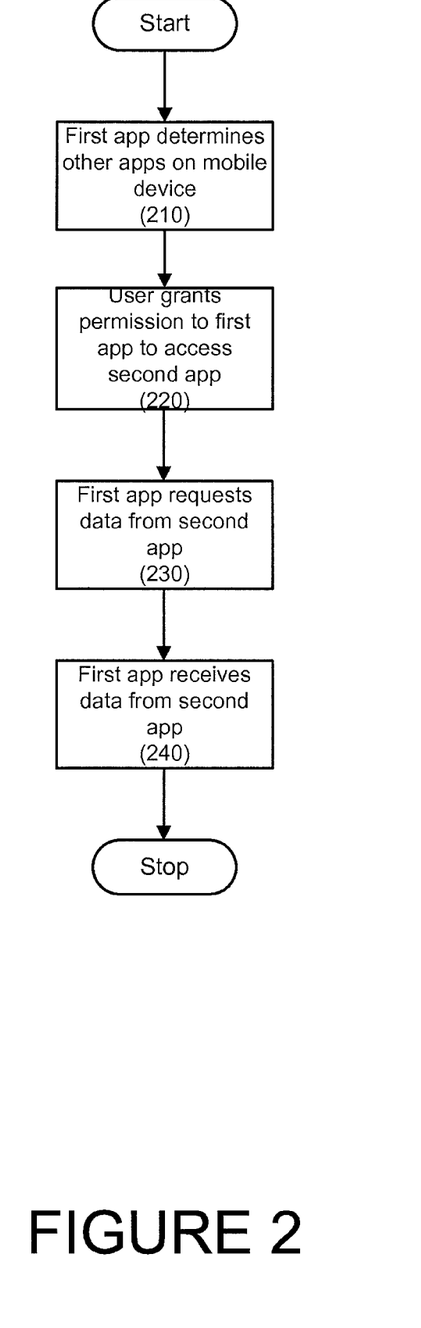
FIG. 2 is a flowchart depicting a method for communications among mobile applications according to one embodiment.

Referring to FIG. 2, a method for communication among applications is disclosed.

In step 210, a first application determines what other applications may be present on a mobile device. In one embodiment, the mobile application may check a registry portion of the mobile device. In another embodiment, the mobile device may check a remote registry (e.g., a registry stored on a server, on a different electronic device, etc.). In another embodiment, the mobile application may "scan" the mobile device for installed applications. In yet another embodiment, the mobile device may attempt to open a URL for an application, or an application itself, without further information. In still another embodiment, the mobile application may request that a third party application respond to a request for information.

In one embodiment, the first application may be an application for a specific business/service, such as a financial institution, a travel service, a merchant, a mobile wallet, etc. In another embodiment, the first application may be part of the operating system for the mobile device.

In step 220, the user may grant permission to the first application so that the first application may access a second application. In one embodiment, the user may grant permission within the first application, or within the second application, or within both. In one embodiment, the user may grant permission on-line, or through a source of the applications (e.g., an application store). In still another embodiment, the permission may be given to a third application, an operating system, or other software.

In one embodiment, permission may be pushed down to the mobile application from the host of the mobile application, third party application, etc. In one embodiment, a whitelist of applications that may be granted access may be provided. In another embodiment, a blacklist of applications that may not be granted access may be provided.

In one embodiment, the user may grant permission by putting multiple mobile applications in the same group, folder, etc. For example, a user may put a banking mobile application and a travel mobile application in the same folder or mobile application group. By doing so, these mobile applications may be granted permission to communicate with each other. When the user removes one of the mobile applications from this grouping, the permission may be revoked.

In one embodiment, if multiple levels of folders, groupings, etc. are used, permission may be granted for the higher level mobile applications to communicate with the lower-level applications, but the lower-level applications may not communicate with the higher level applications.

In one embodiment, the user may be able to customize the permissions that are granted to applications in the same folder, different levels of the same folder, etc.

In one embodiment, the user, mobile application host, etc. may be able to revoke permission for one or more mobile application to access a third party mobile application. For example, a bank may be able to prevent a mobile application hosted by the bank from communicating with some, or all, third party mobile applications as necessary and/or desired.

In one embodiment, the folder structure in one mobile device may control or influence applications on another device owned by, registered to, assigned to, or associated with the user. For example, the hierarchy on one device may be duplicated on another device. In one embodiment, only the permission structure may be duplicated; the icons may remain in different folders if desired. In one embodiment, the user may authorize or reject such duplication.

Figure 3:
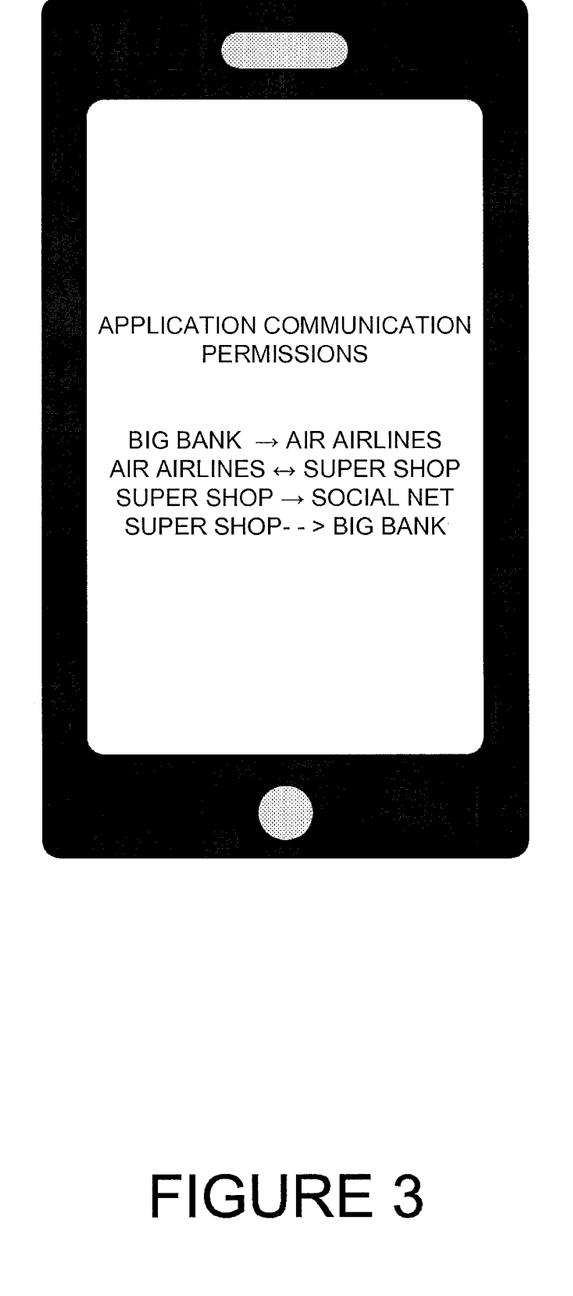
FIG. 3 is an example screenshot of application communication status according to one embodiment.

In one embodiment, the user may be presented with a representation of applications that have been granted permission to communicate with each other. Referring to FIG. 3, an exemplary representation of application communication permissions is provided. Arrows, for example, may be used to indicate the communication permission that each application has been granted. In one embodiment, the user may change permissions by, for example, swiping the permission and selecting a permission.

Other symbols may be used to indicate limited communication permissions (e.g., a dashed arrow to indicate access to rewards balance information only) as necessary and/or desired.

In one embodiment, the folder structure, if used, may be automatically updated to reflect the permissions.

In step 230, the first application may request data from the second application. In another embodiment, the first application may request the data for a third application.

In one embodiment, the first application may request the data from the second application by providing the user's username and password. In another embodiment, the first application may provide a code that may be used to access the second application.

In step 240, the first application may receive the requested data. In one embodiment, the data may be provided from the second application. In another embodiment, the data may be provided from a third application.

In another embodiment, an application on a first mobile device may communicate with an application on a second mobile device. In one embodiment, this may be done by sharing a uniform resource locator (URL). For example, if a user of a first mobile device desires to make a payment to a user of a second mobile device, a mobile application on the first mobile device (i.e., the one sending the payment) may provide a link to a mobile application on a second mobile device. In one embodiment, this may be done by encoding a URL, generating a QR code, etc. and making it available to the receiving device, by, for example, near field communication, Bluetooth, optical scanning, or ay any suitable communication protocol.

In one embodiment, each account may earn its own reward points based on the selection of the account.

When the second mobile device receives the code, a mobile application on the second mobile device may be selected, and the payment is completed.

In one embodiment, one or more "personas," or profiles, may be established for the user of a mobile device. The persona may be used to control or influence user behavior, such as purchase behavior, communication, recommendations/suggested behaviors for the user, travel, expense tracking, interaction with the mobile device, etc. Other behaviors may be influenced as is necessary and/or desired.

For example, a user may establish multiple personas, such as a "business" persona, a "vacation" persona, and an "everyday" persona, that may control or influence purchasing behavior, and, in one embodiment, the user may customize the default behavior associated with each persona. For example, in the "business" persona, because the user is reimbursed for expenses, the user may default to behaviors that do not redeem points, but are still cost-effective to the user's employer. Thus, when making a purchase, the persona may default to, or recommend using, a corporate credit card, making travel arrangements through the employer's travel agent, etc.

For a "vacation" persona, the user may prefer the use of rewards points, discounts, etc. over behaviors that would result in the accumulation of rewards points. Thus, the persona may default to, or suggest, redeeming rewards points when possible.

For the "everyday" persona, the user may prefer behavior that results in maximum accumulation of reward points unless the cost is above a certain threshold. Thus, the persona may default to, or suggest using, a high rewards point earning credit card.

Other personas, such as personas based on the time of day, may be used. For example, around lunchtime, a "lunchtime persona" may be activated, and the user may be pushed notifications on local dining specials, recommendations, etc. In one embodiment, the mobile application may even suggest and/or make lunch reservations. For an "evening persona," the user may only be notified of important messages, telephone calls, etc.

Personas may also be used to select social media sharing status. For example, a "social-share" persona may be used to allow automatic posting to social media sites, automatic update of location information (e.g., for "Find My Friends" and similar apps). A "social-private" persona may be used when the user does not wish to have information automatically posed to social media and/or location tracking applications.

In another embodiment, an emergency persona may be provided for situations where the user may be lost, stranded, with limited resources, etc. For example, if a user activates the emergency persona, the mobile device may go into a low-power mode to extend battery life, and may periodically send help request messages, location information, etc. In one embodiment, the device may periodically activate its radio to check for any responses, and then power down to a low-power state.

In another embodiment, a travel contingency persona may be established. For example, if a user is traveling and misses a flight, or if a flight cannot leave due to weather, maintenance, etc., requiring the user to stay (unexpectedly) in a location other than his or her destination, the travel contingency mode may be used to, for example, rebook a flight, check on a hotel, schedule a meal, send a notification to persons on a contact list, launch weather tracking applications, etc. In one embodiment, the application may further reschedule meetings that will be missed due to the delay. In one embodiment, the user may select the actions that he or she would like to take when this persona is activated.

By establishing, and activating, these personas, a global mobile application, or a single mobile application, may inform the other applications of the default behavior.

Other behaviors for the personas may include maximizing cash back, maximizing discounts, the use of social discounts (e.g., Groupons, Living Social, etc.), minimizing interest payments, maximizing payoff time, maximizing points with a particular provider (e.g., a specific airline), etc.

In one embodiment, the persona may suggest a default behavior, but the user may override the default behavior as necessary and/or desired. For example, when the user seeks to conduct a transaction, the default behavior for the selected persona may result in a recommendation to the user. The user may either agree with the recommendation, or may select a different behavior.

In one embodiment, the persona may also control or influence communications using the mobile device. In one embodiment, the business persona may only alert the user to calls, texts, emails, etc. that are from a source that is approved by the user. The everyday persona may pass all calls, texts, emails, etc. to the user.

The persona may also apply to members of a family. For example, any subordinate accounts (e.g., accounts for the user's children) will take on the same persona as the primary account. In one embodiment, the user of the primary account may establish separate personas for the subordinate accounts, may authorize the user of the subordinate account to create personas, etc.

In one embodiment, the user may manually select an active persona. In another embodiment, the user may set the default persona based on the time of day (e.g., business persona from 8 am to 6 pm weekdays, personal persona at other times). In still another embodiment, a mobile application may select a persona based on the user's calendar. In still another embodiment, the mobile application may select a persona based on the location (e.g., GPS location) of a mobile device. In another embodiment, the mobile application may select the persona based on "ambient intelligence," such as the identities of other individuals near the mobile device. For example, if the mobile application determines that the mobile device is in an environment with mobile devices that belong to friends, and select the everyday persona. If the mobile application determines that it is on the user's work network, the mobile application may select the business persona.

Any one or more of these factors may be used by the mobile application to select a persona as is necessary and/or desired.

The mobile application may also look at the user's spending habits to further refine the behavior for each persona. For example, the mobile application may learn that in the "everyday" persona, the person generally shops locally, and seeks the lowest possible price while maximizing rewards. Based on this, the mobile application may select the most appropriate payment mechanism to meet this goal, and rank the less-suitable mechanisms lower. The mobile application may also determine that when using the vacation persona, the user likes to play golf. Thus, when active, the vacation persona may be refined to identify and suggest golf courses, find tee times, discounts, etc.

In one embodiment, the persona may also look for opportunities to meet the persona's goals. For example, the persona may push notifications to the user based on opportunities to earn rewards, use rewards, etc. The notifications may be based on the mobile device's location, timing, etc. and may be customized by the user.

The mobile device may also use the belief-desire-intention model to assist in selecting a persona, wherein an order specified by the user may determine the persona.

Although the persona may be described herein in the context of a mobile device, it should be recognized that the persona may be applicable to a user using a desktop computer, laptop computer, tablet computer, e-reading device, etc. In one embodiment, the active persona from the mobile device may be applied to the other devices as necessary and/or desired.

Figure 4:
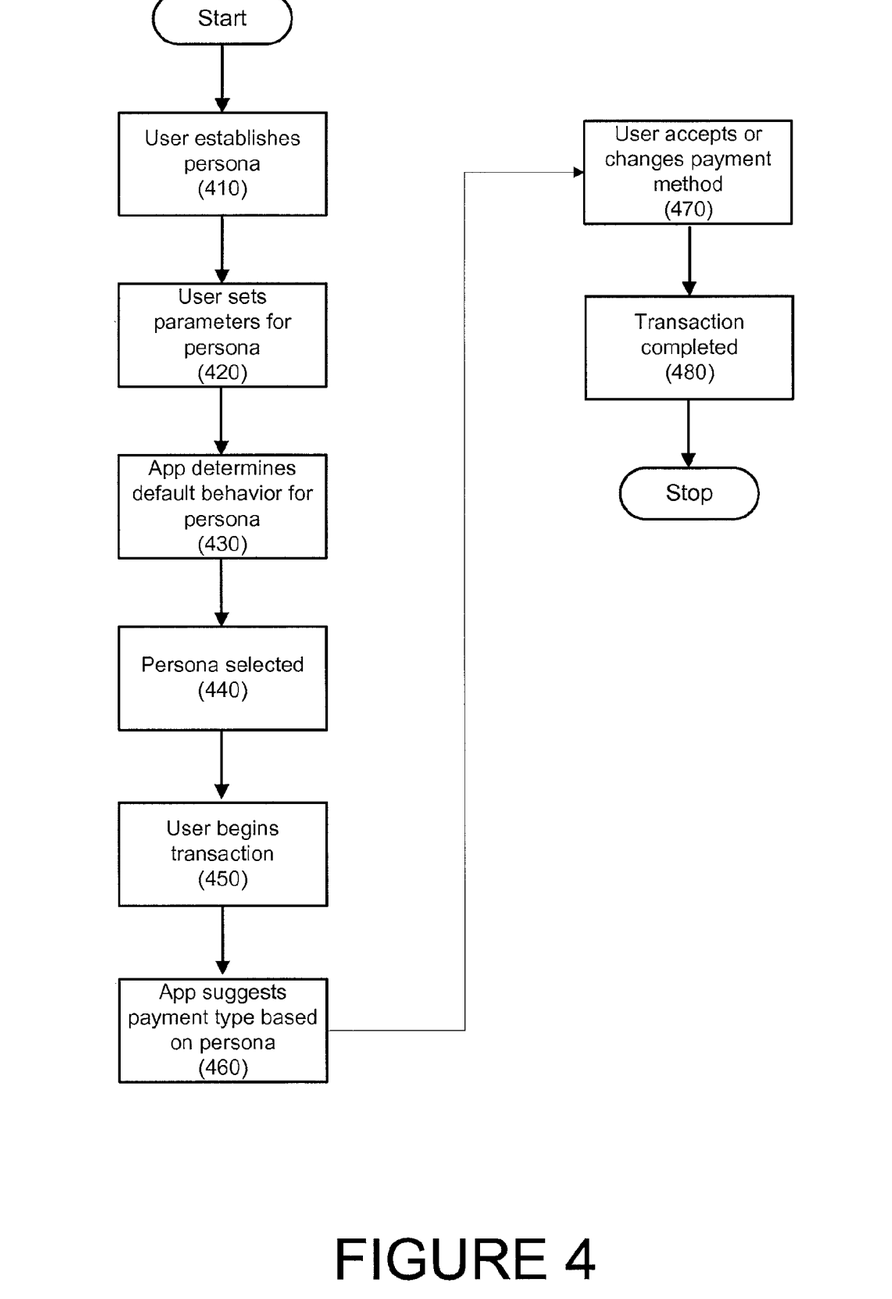
FIG. 4 is a flowchart depicting a method for persona management according to one embodiment.

Referring to FIG. 4, a method of using a persona according to one embodiment is disclosed. In step 410, the user may establish at least one persona. As discussed above, the persona may control or influence at least one user behavior, such as spending, communication, etc. In one embodiment, separate personas may be established for different behaviors, and more than one persona may be active at one time. For example, the user may have an active persona for purchases and an active persona for communication both active at the same time.

In one embodiment, the user may select from default personas to use. The user may customize the behavior of each persona as necessary and/or desired.

In another embodiment, the user may establish personas by answering questions, responding to questions, etc. For example, the user may be presented with the following statement: "During non-working hours, I like my friends to know where I am" and asked whether or not he or she agrees or disagrees with the statement. Based on the response, and other responses, multiple personas may be created for the user. The user may be able to refine the personas as necessary and/or desired.

In another embodiment, the mobile application may learn the user's behavior over a period of time, and establish personas based on that behavior. For example, there may be a "weekday" persona, "evening persona," "travel persona," "weekend persona," etc.

In one embodiment, the user may specify a hierarchy for the personas in the event of a conflict between personas. For example, a user may specify a ranking of personas. This may include, for example, different aspects of the persona (e.g., rewards earning) that may trump other personas.

In another embodiment, any conflicts may be resolved based on historical selections. For example, if a user selected a business persona over a personal persona when there was a conflict in the past, the system may select the business persona for the next conflict.

In one embodiment, the user may be informed of a conflict and may be provided with a recommendation for a selected persona to control the conflict. The user may the agree or disagree with the recommendation.

In one embodiment, a default hierarchy may be provided.

In step 420, the user may set one or more parameter for the persona. For example, for spending personas, the user may specify the default purchase behavior. Thus, the user may identify a particular payment mechanism (e.g., a certain credit card, stored value card, etc.) or may rank order multiple payment mechanisms. In another embodiment, the user may specify a goal, like "maximize rewards" and the mobile application may determine which available payment mechanism(s) meet that goal.

In one embodiment, the mobile application may also define or modify the parameters of the persona based on the user's history.

In step 430, the mobile application may determine the default behavior for each persona. In one embodiment, the mobile application may base the determination on past behavior (e.g., purchases, communication, etc.) by the user, demographic profiling, anticipated activities (e.g., upcoming events on one's calendar, activities of others, user's location, etc.).

In step 440, at least one active persona may be selected. In one embodiment, the user may manually select an active persona. In another embodiment, the user may set the default persona based on the time of day, location, etc.

In one embodiment, the mobile application may select the active persona. This may be based on consulting the user's calendar, social networking entries, etc. The mobile application may also select a persona based on the location (e.g., GPS location) of the mobile device.

In another embodiment, the mobile device may use "ambient intelligence," or intelligence based on the mobile device's surrounds, to select an active persona.

In one embodiment, the selection of the active persona may be updated, refined, etc. as is necessary and/or desired.

Any one or more of these factors may be used by the mobile application to select a persona as is necessary and/or desired.

In step 450, the user may begin to conduct a transaction. Although this description will be in the context of a purchase, it should be recognized that this is exemplary only as the personas have wide applicability.

In one embodiment, a user may approach a point of sale device, may conduct an online transaction, etc. During the course of the transaction, in step 460, the mobile device may suggest the default payment mechanism(s) based on the active persona.

In one embodiment, in step 470, the user may confirm the use of the default payment mechanism. In another embodiment, the user may select an alternate payment mechanism.

In one embodiment, the user's selection may be posted to social media. In another embodiment, the user may request an alert (e.g., a notification) based on the selection.

In step 480, the transaction may be completed using the selected payment mechanism. In one embodiment, the mobile application may further refine the persona based on whether the user accepted the default payment mechanism, whether the user selected a different payment mechanism, etc.

In one embodiment, the active persona may be used as an anti-fraud measure. For example, if the vacation persona, business trip persona, etc. is enabled, purchases that are outside of the typical spending area for the user may not be flagged as unexpected, potentially fraudulent, etc.

In one embodiment, the mobile application may inform, for example, the issuer of a credit card of the active persona.

In one embodiment, this may be done periodically (e.g., a "heartbeat"); in another embodiment, the mobile device may inform the issue when the persona changes; in still another embodiment, the mobile device may inform the issuer only when certain personas are active, or inactive. Any combination of the above, or any other notification techniques, may be used as necessary and/or desired.

In another embodiment, instead of, or in addition to, the persona, the mobile device may transmit a location of the mobile device to, for example, the credit card issuer. As with the persona, this may be done periodically, when the location of the mobile device changes (e.g., beyond a certain range), when the mobile device enters/exits certain areas, or as necessary and/or desired.

In one embodiment, the notification may be in addition to, or in place of, any notifications that the user may provide the issuer before traveling.

The mobile application may further send a periodic location message from the mobile device to the card issuer for this reason.

The disclosures of the following are hereby incorporated, by reference, in their entireties: U.S. patent application Ser. Nos. 13/803,298, 61/585,057, and 13/492,126.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the font' of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for a first mobile application and a second mobile application on a mobile device to share information, comprising:

the first mobile application executed by a computer processor on a mobile device determining that the second mobile application is present on the mobile device;

receiving, from a user, permission for the first mobile application to access data from the second mobile application;

the first mobile application executed by the computer processor requesting data from the second mobile application; and the first mobile application receiving the requested data from the second mobile application.

2. The method of claim 1, wherein the first mobile application determines that the second mobile application is present on the mobile device by accessing a mobile device registry.

3. The method of claim 2, wherein the mobile device registry is on the mobile device.

4. The method of claim 1, wherein the first mobile application determines that the second mobile application is present on the mobile device by scanning the mobile device for applications.

5. The method of claim 1, wherein the permission is received by the first mobile application directly from the user.

6. The method of claim 1, wherein the permission is received at a website for a host of the mobile device.

7. The method of claim 1, wherein the permission is received at a website for a host of the first mobile application.

8. The method of claim 1, wherein the permission is received by the second mobile application directly from the user.

9. The method of claim 1, wherein the permission is based on the first mobile application and the second mobile application being grouped together on the mobile device.

10. The method of claim 1, wherein the first mobile application requests data from the second mobile application by providing the user's name and password.

11. The method of claim 1, further comprising:

the first mobile application executed by the computer processor providing the received requested data to a third mobile application.

12. A method for a first mobile application and a second mobile application to share information, comprising:

the first mobile application executed by a computer processor on a first mobile device determining that the second mobile application is present on a second mobile device;

receiving, from a user, permission for the first mobile application to access data from the second mobile application;

the first mobile application executed by the computer processor requesting data from the second mobile application by providing the second mobile application with a uniform resource locator; and the first mobile application receiving the requested data from the second mobile application via the uniform resource locator.

13. The method of claim 12, wherein the uniform resource locator is provided in a machine-readable code.

* * * * *